H. B. THORNTON & J. W. HAMMOND.
GAS METER.
APPLICATION FILED DEC. 9, 1912.
1,090,507.
Patented Mar. 17, 1914.
4 SHEETS—SHEET 2.
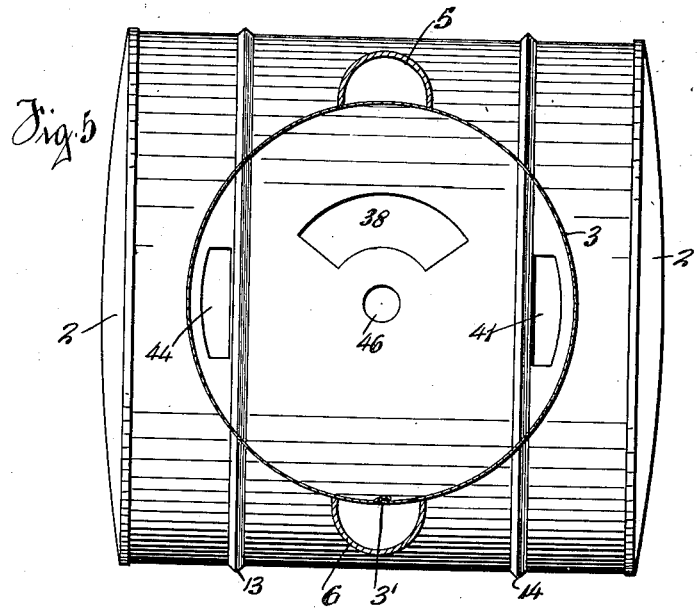
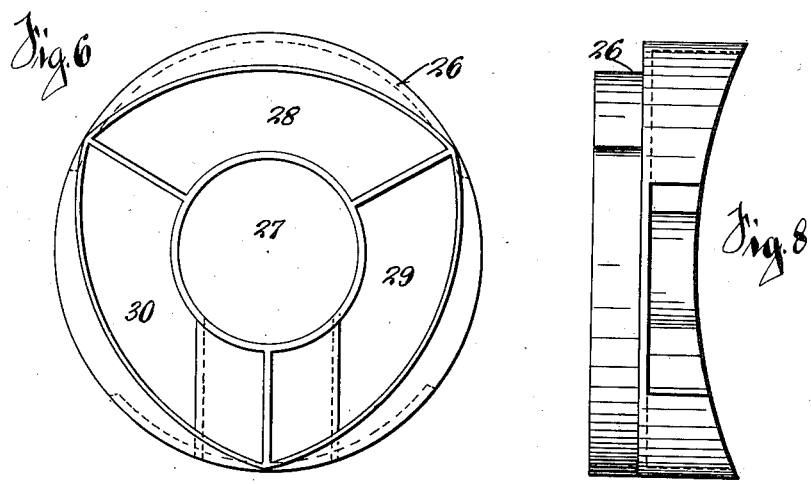
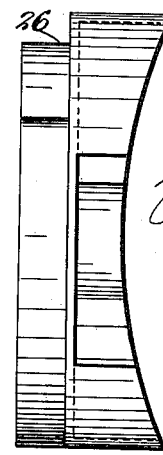
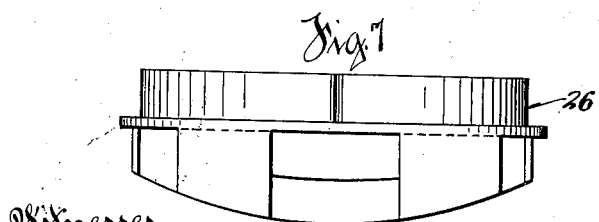
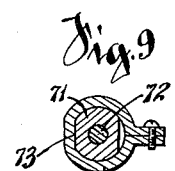
Witnesses
Oliver Norman
Catherine Doran
Inventors
Harry B. Thornton
John W. Hammond
By James N. Ramsey
Attorney

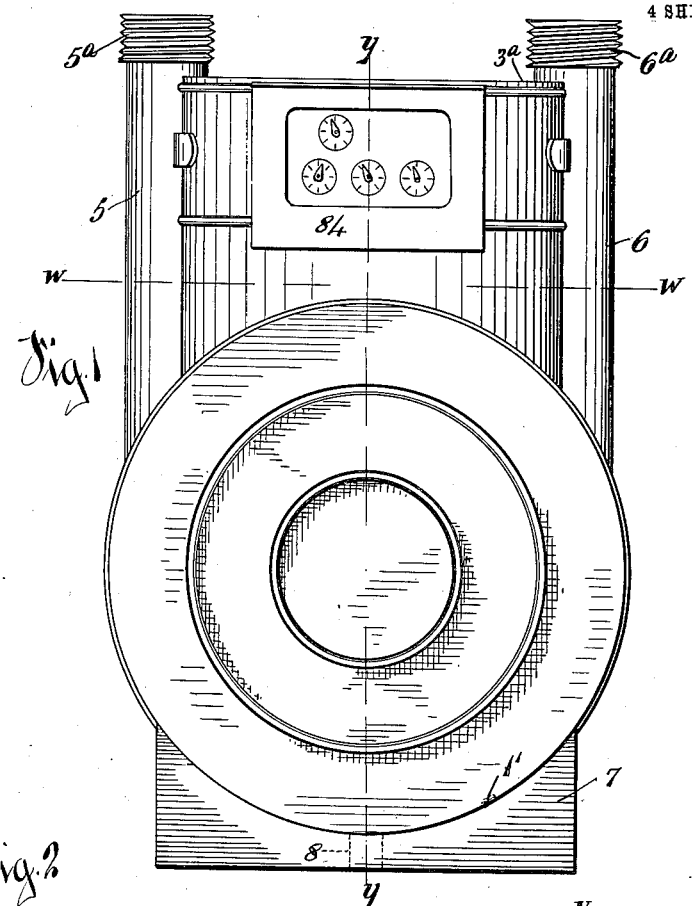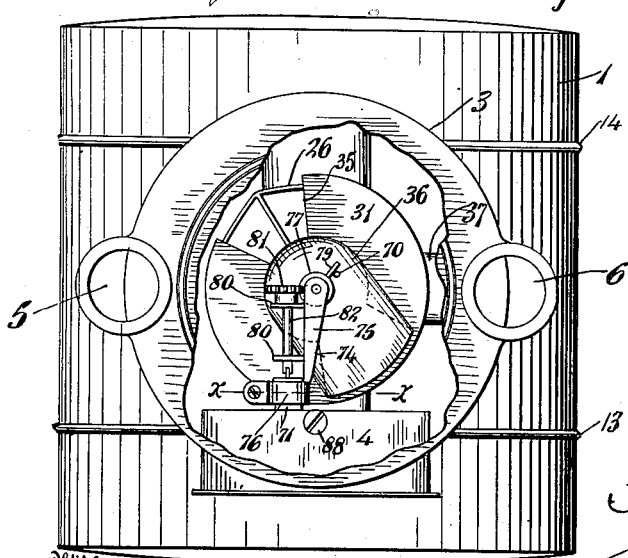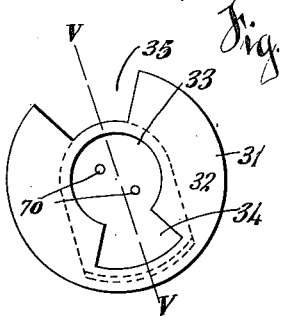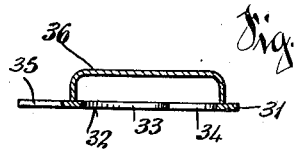

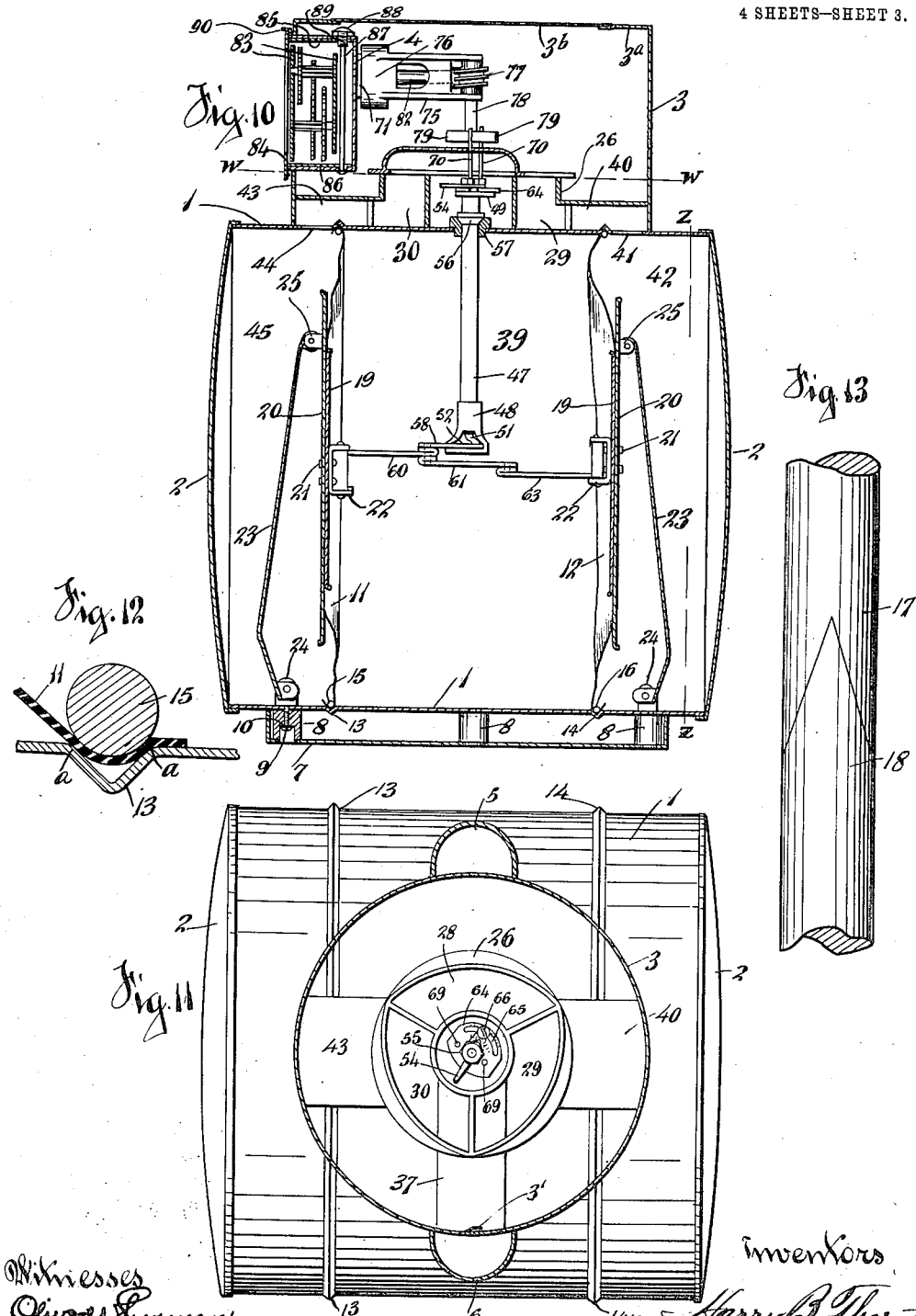

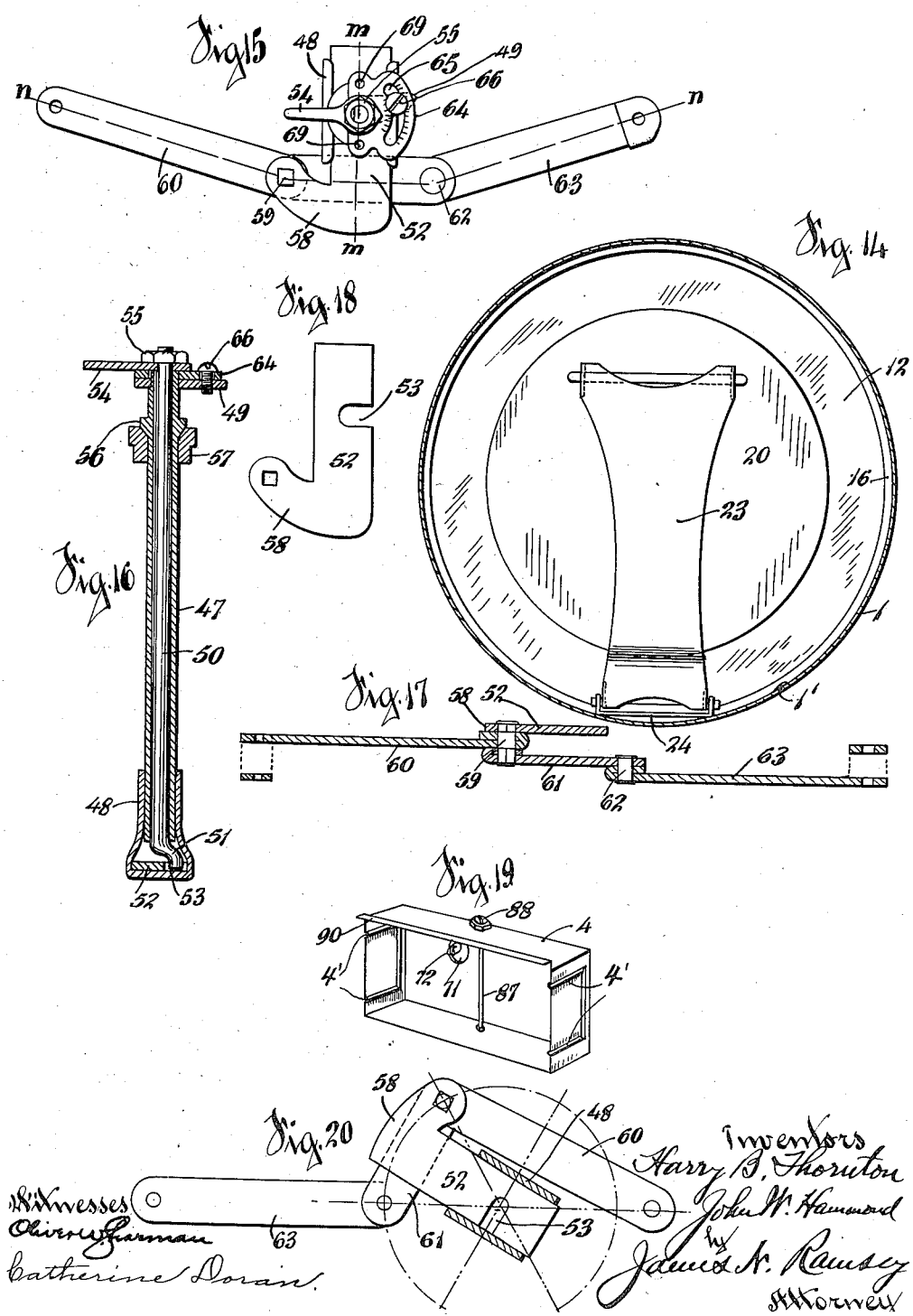

UNITED STATES PATENT OFFICE.

HARRY B. THORNTON, OF CINCINNATI, OHIO, AND JOHN W. HAMMOND, OF LONG-BEACH, CALIFORNIA, ASSIGNORS TO AL. E. DAVIS, OF SAN DIEGO, CALIFORNIA.

GAS-METER.

1,090,507.          Specification of Letters Patent.      Patented Mar. 17, 1914.

Application filed December 9, 1912. Serial No. 735,754.

*To all whom it may concern:*

Be it known that we, HARRY B. THORNTON and JOHN W. HAMMOND, citizens of the United States, residing, respectively, in Cincinnati, in the county of Hamilton and State of Ohio, and in Longbeach, in the county of Los Angeles and State of California, have invented certain new and useful Improvements in Gas-Meters, of which the following is a specification.

Our invention relates to meters, especially to gas meters installed in houses and other places, to measure gas used by the consumers.

The object of our invention is to provide a meter of large capacity, yet of great sensitiveness, and which will at the same time be stronger and more durable.

A further object is to lessen the ease with which the meter may be tampered with, and at the same time facilitate proper access to its interior, for the purposes of repairing, adjusting and inspecting the meter.

Further, with all of these advantages, it is sought to provide a meter of more economical construction and which will be much smaller and more compact and lighter than meters heretofore disclosed having similar capacity.

With this and other objects in view, our invention consists in the meter and in the details of construction and arrangement of parts as will hereinafter be more fully described and claimed.

In the drawings: Figure 1 is a front elevation of a meter embodying our invention. Fig. 2 is a plan view of the same, part of the cover being indicated as broken away to reveal some of the interior mechanism. Fig. 3 is an inverted plan view of the valve. Fig. 4 is a section on the line $v$—$v$ of Fig. 3. Fig. 5 is a sectional plan view, the section being taken on the line $w$—$w$ of Fig. 1, with the valve and its seat and other mechanism removed. Fig. 6 is a plan view of the valve box. Fig. 7 is a side elevation of the same taken on the right hand side facing the meter. Fig. 8 is a rear elevation of the same. Fig. 9 is a cross sectional view on the line $x$—$x$ of Fig. 2 illustrating how the worm gear bracket slips onto the hub on the dial box. Fig. 10 is a longitudinal vertical sectional elevation on the line $y$—$y$ of Fig. 1, showing the general interior mechanism of the meter. Fig. 11 is a cross sectional plan view similar to Fig. 5, the section being taken on the lines $w$—$w$ of Figs. 1 and 10, the valve seat, the ports, and part of the valve operating mechanism being shown in place. Figs. 12 and 13 are enlarged details of the means for securing the flexible diaphragms in the casing. Fig. 14 is a vertical cross section through one end of the casing on the line $z$—$z$ of Fig. 10, showing the mounting of the diaphragm plate. Fig. 15 is a detail plan view showing the means that connects the valve to the diaphragm. Fig. 16 is a vertical section on the line $m$—$m$ of Fig. 15. Fig. 17 is a longitudinal vertical section on the line $n$—$n$ of Fig. 15. Fig. 18 is a detail of the crank arm. Fig. 19 is a detail of the dial box. Fig. 20 is a detail plan view of the crank arm in its stirrup with the connecting rods attached, the parts being in another position from that illustrated in Fig. 15.

A primary consideration in the construction of our improved gas meter is the provision of a casing for it which will not be disrupted by collection and freezing of moisture. Accordingly we have adopted sheet metal as the material for the casing and have so constructed it and combined it with the operative parts of the meter as to insure durability, freedom from tampering and convenience of access. At the same time the amount of soldering required has been greatly reduced. Along with improved interior construction we have provided this sheet metal casing with a sheet metal base that protects the casing and provides it with proper drainage so that even the damage to which a sheet metal casing is susceptible due to moisture is practically eliminated. Thus, the cylindrical main casing shell 1 has the end caps 2 and on top is mounted the dome 3, carrying the dial case 4 in front. Flanking this dome 3 are the inlet and outlet pipes 5 and 6 respectively, as is seen in Fig. 1. The bodies of these tubes are also made of sheet metal of semi-circular tubular formation and soldered onto the sides of the dome and carried completely down to the adjacent sides of the main shell 1 to conform and be soldered thereto, thereby reinforcing the casing. However, threaded nipples 5ᵃ and 6ᵃ complete the upper ends of these tubes and overlap and are soldered to an upper flange 3ᵃ of the dome 3. A cap 3ᵇ is soldered down to this flange and is unsoldered for access to the interior of the dome or valve gallery.

The dome 3 has its seam 3' at one side, covered and reinforced by the tube 6.

The base 7 is a rectangular box with its upper edges so formed as to receive the bottom of the shell 1 and conform and be soldered thereto. As will be seen in the drawings, the lowest part of the shell 1 is held a considerable distance above the bottom of this box-like base 7, as best seen in Fig. 10. Within the space thus left, extending from the lower side of the shell down to the upper side of the base bottom and soldered to both, are drain blocks 8 arranged in series from front to rear. Each of these blocks has a bore, registering with a respective opening through the shell 1. The lower end of the bore in each block is counterbored and an opening through the base bottom is continuous with each counterbore. The bore of each block is threaded, and screws 9 are screwed into the bores, with gasket washers 10 under their heads, thus effectually closing each opening. The main casing shell 1 has its seam 1' near its bottom, partially covered and reinforced by base 7.

The main casing, which is closed by the shell 1 and the two end caps 2, is divided interiorly into three compartments by front and rear diaphragms 11 and 12 respectively, as will be clearly seen in Fig. 10. It will also be seen that one of the drain blocks 8 above described is provided for each compartment. Thus by removing the screw 9 in any one of the drain blocks 8 the respective compartment may be drained individually through the drain spout thus formed by the drain block. Individual, rather than collective drain apparatus is preferred, as it prevents by-pass of gas through the efforts of one tampering with the meter.

The base 7, constructed as above described, leaves a tightly sealed compartment between the main body of the meter and the shelf on which the meter is ordinarily set. Being air tight, this compartment thus acts to effectually insulate the meter from dampness that would otherwise be transmitted to it from the shelf and the walls of the building. In an extremely damp location the base might become rusted and part of it destroyed, but considerable exposure could take place before the meter itself would be affected.

Each of the diaphragms 11 and 12 comprises a flexible material not deteriorated by the gas; leather being ordinarily used. A marked improvement is in the means of securing these flexible diaphragms to the casing shell 1, so that they will not be injured due to the fastening means either while the meter is being constructed or while it is in use. Thus, the casing shell 1 is provided with annular beads 13 and 14 for the diaphragms 11 and 12, respectively. These beads are formed outwardly so that there are provided annular grooves extending around the interior of the shell where the diaphragms are to be attached. The flexible diaphragms are placed in the casing and wire rings 15 and 16 respectively are placed around over the diaphragms holding their adjacent materials down into the grooves all around. The preferred formation and arrangement of these is best seen in Fig. 12. It is desirable that the wire ring, which is of circular cross section, shall clamp the diaphragm material around two separated lines of contact. Thus the beads 13 and 14 are made of V-shaped cross section, of such a width relative to the diameter of the rings that the rings will clamp the diaphragm material at the upper edges of the channel thus formed, as at the points $a$, $a$, in Fig. 12. This construction of the joint between the diaphragm and casing is more effective against leakage and more durable and involves less wear and tear on the flexible diaphragms than if the ring and groove were made to correspond in shape and simply embedded the diaphragm material into the groove. The ring 15 is not sprung into place; it is made of just the right length to tightly clamp the diaphragm at every point around the casing. The junction of the ends of the ring is illustrated in Fig. 13. One end 17 of the ring has a V-shaped crotch and the other end 18 is adapted to fit accurately in this crotch. These formations of the ends 17 and 18 are made so that they slip together in directions substantially radially of the ring, and it is possible to have them so fitted that the ring may be very tightly forced into place by the very simple operation of forcing the pointed end 18 sidewise down into the crotched end 17. All soldering is thus avoided, eliminating the danger of burning the flexible diaphragms with the soldering apparatus, as often happens when the diaphragm fastening involves soldering.

Each diaphragm has, centrally located, the inner and outer plates 19 and 20, respectively. These plates are secured together by bolts 21 which pass through them and through the diaphragm and these bolts also secure connecting arm brackets 22 to the inner plate 19 for the connection of mechanism to be later described. The inner plate 19 is considerably less in diameter than is the outer plate 20 on each diaphragm. Thus constructed when the diaphragm reaches the inner regions of its stroke, the flexible material will be drawn against the periphery of the larger outer diaphragm 20, but when the diaphragm is in the outer part of its stroke this material will be drawn over the periphery of the smaller inner diaphragm 19. Thus the annular regions of abrupt flexure are separate and distinct on the outer and inner sides, and the wear and tear due to this flexure, distributed in two regions widely separated, is greatly less than when this effect is produced merely on opposite sides of the diaphragm in the same region. The same benefit is derived from the above described improved means of attaching the diaphragm to the casing shell. When the diaphragm is in the outer part of its stroke the flexible material is merely stretched from its line of clamping between the ring and the adjacent edge of the groove, whereas when the diaphragm is in the inner part of its stroke the flexible material is stretched from its line of clamping around the convex surface of the ring, thus providing two different and separate regions of flexure at the different parts of the stroke. The diaphragms are mounted on arms 23, each located outside its respective diaphragm. These arms 23 are pivoted in brackets 24 fixed to the floor of the casing. They extend up close to the upper edges of the outer diaphragm plates 20 and are pivoted to ears 25 which are integral with the plates 20, being punched out therefrom. Each arm 23 is bowed outward near its lower end so that it may allow the diaphragm to reach its extreme outward position without the plate 20 coming against the arm. By carrying the pivotal point of attachment of the arm 23 to the diaphragm as far up as indicated, a straight line movement of the diaphragm inward and outward is more nearly approximated than when the arm is pivoted to the diaphragm near the center thereof.

Referring again to the upper part of the meter, the inlet pipe 5 leads directly into the valve gallery inside the dome 3. Centrally located in the valve gallery is the valve box 26, soldered to the upper side of the main shell 1. The formation of this valve box may be fully understood from Figs. 6, 7 and 8. It comprises a central circular compartment 27 surrounded by three segmental compartments 28, 29 and 30, the particular shape of which will be later described. The upper edges of all the walls and partitions that define these compartments are ground to an accurate plane surface and upon this rests the valve 31. The base part 32 of the valve has its lower side ground to an accurate plane surface to bear on the upper surface of the valve box. This bottom 32 has a central aperture 33 of a little less diameter than that of the central compartment 27 of the valve box, and there is a continuation 34 from this central aperture, of sector shape, which extends radially outward a distance somewhat short of the outer bounds of the various compartments 28, 29 and 30 of the valve box 26. Diametrically opposite from this continuation 34 is another sector shaped opening in the valve base 32 which, however extends completely to the periphery of this bottom, but terminates radially inward short of the inner walls of the compartments 28, 29 and 30 which separate them from the central compartment 27.

Fixed to the upper side of the bottom 32 is a top 36 for the valve, in the form of a cap that completely covers the central aperture 33 and its sector shaped continuation 34. This cap preferably conforms to the outline of the aperture 33 and its continuation 34.

A port 37 leads laterally into the outlet pipe 6 from the central compartment 27 of the valve box, passing through the compartments 29 and 30 under the partition which separates them, and through their outer walls, and being soldered to these parts and to the upper surface of the main shell 1 so that there can be no communication from the valve gallery or from either of said compartments 29 and 30, to the outlet pipe 6. The compartment 28 communicates directly down, through an aperture 38, with the middle compartment 39 of the main casing between the diaphragms 11 and 12. A rear port 40 leads back from the compartment 29 to an aperture 41 through which it communicates with the rear compartment 42 of the main casing behind the diaphragm 12. This port is soldered to the valve box 26, to the upper surface of the shell 1, and to the inner surface of the shell of the dome 3, so that there may be no communication from the valve gallery to the compartment 42, but only from said compartment 42 to the compartment 29 in the valve box. Similarly, a forward port 43 leads forward from the compartment 30 of the valve box to an aperture 44 in the shell 1, through which it communicates with the forward compartment 45 of the main casing in front of the diaphragm 11. These apertures 38, 41 and 44 may be clearly seen in Fig. 5. There is a small circular aperture 46 central of the valve gallery in the shell 1 of the casing, to allow the passage of the operative connecting means from the diaphragms 11 and 12 to the valve 31, so that these diaphragms by their movements may rotate this valve on its seat on the valve box 26. This operative connection comprises a tubular outer shaft 47 on the lower end of which is fixed a stirrup 48, and on the upper end of which is fixed an arm 49. Through this outer tubular shaft 47 passes an inner shaft 50, the lower end of which is in the form of a short crank 51. Slidably mounted in the stirrup 48 is the crank arm 52, and it has a slot 53 within which the end of the crank 51 engages. The upper end of this inner shaft 50 has a flat region and a small handle 54 is held onto this flat region by a nut 55 screwed onto a reduced end part of the shaft 50, which will bind the handle 54 against the upper end of the tubular shaft 47 when adjusted.

The tubular shaft 47, somewhat below its upper end, has a collar 56, the lower side of which is conical, and a bushing 57, which has a conical seat for this collar, is soldered into the central aperture 46 in the upper part of the shell 1, before described. Thus, the tubular shaft 47 may rotate in this bushing and the collar on its seat will prevent leakage of gas from the middle compartment 39 of the main casing up into the central compartment 27 of the valve box.

The crank arm 52 has a lateral extension 58 in which is fixed a downwardly extending stud 59, best seen in Fig. 17. Immediately below this extension, the stud 59 is round and forms the pivot of the connecting rod 60, which leads forward and is pivoted to the forward diaphragm 11 by means of the brackets 22 thereon, previously described. This stud 59 extends farther downward and a lower arm 61 is fixed to it at right angles to the crank arm 52, extending across with a pivot 62 connecting it to the other connecting rod 63, which connects to the rear diaphragm 12 by means of the bracket 22 thereon. The stud 59 and the pivot 62 are so located in the lateral extension 58 and the lower arm 61 that they are offset equal distances in opposite directions. By this construction and arrangement of the connection between the shaft mechanism and the diaphragms, complete rotation of the valve 30 is insured from the movements of the diaphragms, by avoiding any position in which both connecting rods 60 and 63 could be on a "dead center" at the same time.

By means of the central shaft 50, the arm 52 can be slid in its stirrup 48 through rotation of this shaft by its handle 54, which is accessible upon removal of the valve 31 from the valve box. Thus the throw of the crank arm 52 may be adjusted without the necessity of gaining access to the main casing. Furthermore, this adjustment acts on both diaphragms equally, and it is this that regulates the speed of the meter. Another adjusting mechanism comprises the sector plate 64, journaled on the tubular shaft 47 between its arm 49 below and the handle 54 of the central shaft 50 above. This sector plate 64 has a segmental slot 65 through which a screw 66 passes into the arm 49 fixed on the tubular shaft 47. Thus, by loosening this screw 66, the sector plate 64 may be rotated with respect to the arm 49 and the tubular shaft 47, and clamped at any place along the segmental slot. As a means of estimating the amount of adjustment, the sector plate 64 has a series of radial graduations and the arm 49 has a pointed extension slightly beyond the outer arc of the sector plate, thus pointing to the graduations. Also this sector plate has radial graduations adjacent to the hub of the handle 54 and this hub has a small pointed extension opposite the main part of the handle, pointing to this latter graduation. This allows the adjustment of throw of the crank arm 52 by means of the handle 54 to be estimated. This sector plate has holes 69 located, preferably, diametrically opposite on a line through the center line of the shaft mechanism and at right angles to a radial center line through the segmental slot 65. The valve 31 has two pins 70 extending through the top of its cap 36, both above and below. The lower ends of these pins 70 go through the holes 69 in the sector plates when the valve is placed on the valve box, so that when the sector plate turns the valve turns with it. It will now be seen that adjustment of the sector plate 64 with respect to the shaft 47 and its arm 49 amounts to adjustment of this tubular shaft with respect to the valve 31, and it is by this means that the adjustment of the valve relative to the position of the crank arm 52 and the diaphragms connected thereto is accomplished. It will also be seen that this adjustment of the valve with respect to the diaphragms is allowed simply by removing the valve from the valve box without further access into the meter than was necessary to adjust the throw of the crank arm 52 by means of the handle 54 as above described.

The dial box 4, secured in the front of the dome 3 as will hereinafter be more fully described, has a hub 71 fixed to the rear side of its rear wall and projecting back into the valve gallery. Through this hub extends a shank 72, which has a stuffing box in this hub. The rear end of this shaft is flattened, and the hub 71 has a flat 73. The worm gear bracket 74 comprises an arm 75 on the side of a clamp collar 76. This clamp collar 76 clamps around the hub 71, and has a corresponding flat to engage with the flat 73 on the hub, so that it will not turn on the hub, but will be held in such a position that its arm 75 projects back into the valve gallery and carries a worm 77 journaled vertically therein. The shaft 78 of this worm projects down and has wings 79 which will come between the pins 70, where they extend up above the top of the valve cap 36, and be engaged thereby, so that when the valve rotates the worm will rotate with it. The arm 75 carries two brackets 80 and the worm 81 is in mesh with the worm 77, and has a shaft 82 journaled in the brackets 80, extending forward with a slot in its end to receive the flattened end of the shaft 72. Thus, the connection between the worm shaft 78 and the valve being very loose by means of the engagement of the wings 79 with the pins 70, permits the worm gear bracket to be slid backward over the hub and disengaged in the most convenient manner. This entire arrangement allows the most ready removal of the valve 31 from the valve box 26 for access to adjust the parts as above described.

The dial box 4 is soldered into the front of the dome 3, with its rear part extending inside the dome, as seen in Fig. 2. The dial frame 83, (Fig. 10) carrying the standard dial mechanism, slips into the box 4 (Fig. 19) between straight front-to-rear beads 4' on the inside of the box, obviating the necessity of notching or soldering ears to the dial frame, as is ordinarily the case. After the dial frame 83 is thus pushed back into the box 4, the front 84 is inserted into the box, with upper and lower plates 85 and 86 coming against the inner upper and lower sides of the box 4 and extending back to the rear thereof. Then, a pin 87 is passed down through the rear of the top of the box 4, and through the plates 85 and 86 of the front 84, and into the lower side of the box. This pin 87 has, just under its head 88, screw threads 89, which screw into the top of the dial box 4, holding the pin in place. Thus, the front cannot be withdrawn without removing this pin; and this pin cannot be removed without access to the interior of the valve gallery. Since this access is possible only by unsoldering the cap 3b from the dome 3, it will be seen that tampering with the dial by anyone fearing discovery of the act will be effectively discouraged. The front edge of the top of the dial box 4 has a hood 90, which overlaps the upper edge of the front 84 when in place, and adds to the security of the dial box against moisture entering to the dial mechanism. The stuffing-box around the shank 72, in the hub 71, prevents entrance of gas to the dial box from the valve gallery, which, if permitted, results in discoloration of the dial face.

In general, it will be recognized that proper access to the meter is greatly facilitated, while tampering is rendered most difficult. There are no openings through which the flexible diaphragms may be reached; and even access to the valve gallery is practically prevented, so far as anyone fearing discovery is concerned. Also, although made almost entirely of sheet metal, and without the use of any castings, the meter casing parts are amply strong, owing to their generally cylindrical formation, and the advantageous disposition of the attachments to reinforce the seams and joints as has been alluded to.

Our meter is of great sensitiveness, although of large capacity. In practice, it has the capacity of ordinary ten-light meters, and at the same time is so sensitive that this same meter will do the work of an ordinary three-light meter. Owing to the improved means of adjustment and regulation, above described, great accuracy of measurement is possible, either under heavy or light duty. The sensitiveness is largely due to the improvement in the valve mechanism and its operative connection to the diaphragms. The mounting of the diaphragms themselves, to move in an approximately straight line, and to operate with little friction, is also of benefit in securing sensitive and accurate operation.

As may be understood from the description before given, and from reference to the drawings, the central compartment 27 of the valve box 26 is the outlet or exhaust compartment, while the surrounding segmental compartments 28, 29 and 30, communicating with the main casing compartments 39, 42 and 45, respectively, are either inlet or exhaust compartments for their respective main casing compartments, accordingly as they are made to communicate with the valve gallery space, or with the central exhaust compartment 27 by the operation of the valve 31. If the valve 31 brings its opening 35 over a segmental compartment, that compartment will admit gas to its respective main casing compartment. If the other opening 34 of the valve comes over the segmental compartment, that compartment will allow gas to escape from its respective main casing compartment into the central exhaust compartment, from which the gas passes through the port 37 to the outlet or exhaust pipe 6. The parts of the valve and the valve box are so proportioned that these admissions and exhausts will begin and end in accordance with the best operation of the diaphragms 11 and 12 in the main casing, as may be understood is necessary.

Briefly, it may be stated that the openings 34 and 35 in the valve 31 are each of the extent of 60 degrees, located exactly diametrically opposite, so that their radial edges are alined through the center of the valve. Thus, when a certain compartment is fully open to take gas, the other two compartments are exhausting, each through half of the opening 34. Then, when the next compartment begins to open to take gas, it has at the same instant become fully closed against exhaust of gas. From this instant on, for the period of one-sixth of the revolution of the valve, this and the preceding compartment will both be taking gas, this one becoming wider open and the other closing, as the valve advances; and during this same period, the third compartment is exhausting. When the valve has reached a position at which the two are taking gas through equal openings, that third compartment will be exhausting gas through the full area of the opening 34. Thus, it is evident that the relations between the inlet and exhaust conditions are alternately reversing; first a single wide-open inlet and two half-open exhaust compartments in the middle of the period, and then a single wide-open exhaust and two half-open inlet compartments in the middle of that period. These inlets and exhausts of gas, in the sequence described, operate on the diaphragms to cause a steady rotation of the dial mechanism through the operative connections that have been described; and, of course, these connecting mechanisms being intimately associated with the valve itself, as described, the same steady rotation of the valve, and consequent recurrence of the inlet and exhaust of gas, is obtained.

Referring to Fig. 20, it is seen that the connecting rod 63 is on "dead center", but owing to the other connecting rod 60 being so connected to the crank arm 52 by the offset arrangement that the pivotal connections of the respective arms are only 60 degrees apart around a circle with the center of the shaft as the center, as indicated by the dotted lines, the force on this other connecting rod 60 will be available to overcome the "dead center" and continue the driving motion around the circle. This force is provided due to the fact that each one of the compartments 39, 42 and 45 is taking gas, successively, during one-half of its revolution. Thus, the driving periods of the respective compartments, with respect to their diaphragms, overlap, so that each compartment, at the time it takes gas, still has the assistance of the preceding or succeeding compartment in the cycle of operations described.

It will be seen that the outer walls of the compartments 28, 29 and 30 of the valve box 26 are not concentric with those of the central compartment 27, but are struck on radii somewhat greater than if this were the case. Thus, the compartments 28, 29 and 30 are of considerably greater radial extent at their partitions than at their middle regions. This allows more gas to pass into or out of the compartment at the instant the valve opens than in any other instant during the travel of the valve opening over the compartment. Thus, the intake and exhaust may build up rapidly from the beginning, and render the operation of the meter steadier and more sensitive. This, as well as the symmetrical and simple formation of the valve and valve box, permits of great accuracy in results from adjustment of the valve with respect to the diaphragms, by means of the structure hereinbefore described. This, valve adjustment, after the adjustment of the crank arm throw described, enables the meter to be rendered accurate to the greatest desired degree, measuring the smallest used amounts of gas with accuracy equal to the measurement of large consumption.

Having fully described our invention, what we claim as new and desire to secure by Letters Patent is:

1. In a gas meter, a main casing, diaphragms dividing it into compartments, a valve gallery, a valve box in the valve gallery and a valve rotatable on the valve box, operative connections from the diaphragms in the main casing to the rotatable valve in the valve gallery comprising a crank arm in the main casing, and means extending from the crank arm up into the valve gallery and having adjustment for the operative length of the crank arm without access to the main casing.

2. In a gas meter, a main casing, diaphragms in the main casing dividing it into compartments, a valve gallery, a valve in the valve gallery, operative connections between the diaphragms and the main casing and the valve in the valve gallery, said operative connections comprising a crank arm in the main casing, means extending from the crank arm up into the valve gallery for adjusting the operative length of the crank arm without access to the main casing, and means in the valve gallery for adjusting the operative connections with respect to said valve.

3. In a gas meter, a main casing, diaphragms therein dividing it into compartments, a valve gallery, a valve box in the valve gallery, a valve on said box, operative connections extending from the diaphragm in the main casing up to the valve into the valve gallery, engaging means between the operating connections and the valve allowing said valve to be lifted away from said valve box and said engaging means, the operative connections comprising a crank arm in the main casing and means extending from said crank arm up into the valve gallery, under said valve, within said valve box, for adjusting the operative length of said crank arm without access to said main casing, access to said adjusting means being had by lifting said valve as aforesaid.

4. In a gas meter, a main casing, diaphragms in the main casing dividing it into compartments, a valve gallery, a valve box in the valve gallery, a valve mounted on the valve box, operative connections between the diaphragms in the main casing and the valve in the valve gallery comprising a crank arm in the main casing, means extending from the crank arm up into the valve gallery, in the valve box, under the valve, for adjusting the operative length of said crank arm, and means for adjusting the engagement of the operative connection with the valve in said valve box under the valve, the adjusting means of the operative connection with the valve permitting said valve to be lifted away from said operative connection and said valve box to allow access to the several adjusting means.

5. In a gas meter, a main casing, diaphragms in the main casing dividing it into compartments, a valve gallery, a valve box in the valve gallery, a valve rotatable on the valve box, operative connection from the diaphragms in the main casing to the valve in the valve chamber comprising a crank arm in the main casing, means extending from said crank arm up into the valve gallery inside the valve box under the valve, for adjusting the throw of the crank arm, means for the engagement of the operative connection with the rotatable valve, said means permitting the valve to be lifted away from the operative connection and from the valve box to allow access to the several adjusting means, a dial mechanism extending into the valve gallery, a bracket removably mounted on the dial mechanism, means carried by the bracket to operatively connect the valve with the dial mechanism, the mounting of said bracket and the engagement of said operative connection with said valve being such as to allow said bracket and the operative connecting means carried thereby to be removed across the axis of rotation of said valve, whereby when said bracket and operative connecting means are thus removed the valve may be drawn away from said valve box and from the operative connection that extends from the main casing.

6. In a gas meter, a main casing having an annular groove around its interior, a diaphragm comprising flexible material, and a ring holding part of said flexible material in said groove, said ring being formed of a piece, one end of which has a recess opening laterally substantially radially of the ring, and the other end of which has a projection fitting into said recess and being inserted therein substantially radially of the ring, to force said ring upon said material in said groove.

7. In a gas meter, a casing having an annular groove on its interior, a diaphragm comprising flexible material, and a ring clamping part of said material in the groove, said ring being of such shape with respect to the shape of said groove that said material is clamped against two distinct regions of the casing surface, discontinuous with each other across the groove.

8. In a gas meter, a casing having an annular groove of substantially angular cross section around its interior, a diaphragm comprising flexible material, and a ring of convex cross section clamping part of said material, tangentially of its convex cross section, against the casing surface at the regions laterally of the groove where the groove merges into the general interior surface of the casing, and presenting its convex surface against said material across said groove, along the extent of the groove around the casing, without pressing said material against the interior surface of the groove.

9. In a gas meter, a casing having a groove of substantially V-shaped cross section around its interior, a diaphragm comprising flexible material, and a ring of substantially circular cross section clamping part of said material into said groove.

10. In a gas meter, a casing having a groove around its interior, a diaphragm comprising flexible material, a ring holding part of the flexible material in said groove and presenting a convex surface to flexure of said flexible material across the ring outside said groove.

11. In a gas meter, a main casing, a diaphragm therein dividing it into compartments, a base on the casing, and individual drain spouts leading from the respective compartments to the base and means for closing said drain spouts.

12. In a gas meter, a cylindrical casing, a rectangular base on the casing, inclosing an air tight chamber between the base and the casing, a drain block secured between the base and casing within the air tight chamber, and making an air tight connection between said bore and said casing, and having a passage from the interior of the casing to the exterior of the base, and means for closing said passage.

13. In a gas meter, a casing, a base secured to the casing and inclosing an air tight chamber between the base and the casing, and a drain block having air tight connection with the base and with the casing inside said air tight chamber, and having a passage through it from the interior of the casing to the outside of the base and means for closing said passage.

14. In a gas meter, a casing, a base secured to the casing and forming an air tight chamber between the base and the casing, a drain block having an air tight attachment to the base and to the casing inside the air tight chamber, said drain block having a bore through it to the casing and the casing having an opening registering with the bore, said drain block also having a counter-bore extending to the base, and the base having an opening registering with the counter-bore, the bore of the said drain block being threaded, a screw screwed into the threaded bore, a head on the screw occupying a counter-bore and a gasket washer secured between the head and the termination of the counter-bore to form an air tight closure for said bore in the drain block.

15. In a gas meter, operative connecting means comprising a rotatable shaft, a stirrup fixed to the shaft, a crank arm mounted in the stirrup to slide therein across the axis of the shaft, an offset on the crank arm, a connecting rod pivoted to the offset, and another arm fixed to the crank arm, and another connecting rod pivoted to this other arm, whereby said connecting rods are connected to said shaft through said crank arm, at different points around the circle of rotation of the shaft, but at one side of the diameter thereof.

16. In a gas meter, as a part of operative connecting means thereof, a shaft, a stirrup fixed to the shaft and extending axially therefrom; a crank arm slidable in the stirrup, said crank arm being adjusted across the center line of the shaft when it slides in said stirrup.

17. In a gas meter, as a part of operative connecting means thereof, a hollow shaft, a stirrup fixed to the lower end thereof, a crank arm adjustable across the axis of said shaft in said stirrup, and a shaft extending through said hollow shaft and having engagement with said crank arm to adjust it.

18. In a gas meter, as a part of operative connecting means thereof, a hollow shaft, a stirrup fixed to the lower end thereof, a crank arm having a slot and slidable across the axis of the shaft in said stirrup, and a shaft extending through said hollow shaft and having an extension engaging in the slot in the crank arm to adjust the crank arm.

19. In a gas meter, as a part of operative connecting means thereof, a hollow shaft, a stirrup fixed to the lower end thereof, a crank arm adjustable across the axis of the shaft in said stirrup, a shaft extending through said hollow shaft, manipulative means on this shaft above the upper end of the hollow shaft, and means adjacent thereto for holding said hollow shaft and the shaft extending therethrough together and holding said crank arm stationary in said stirrup, to rotate with the shafts.

20. In a gas meter, as a part of operative connecting means thereof, a hollow shaft, a stirrup fixed to the lower end thereof, a crank arm adjustable across the axis of the shaft in said stirrup, a shaft extending through said hollow shaft, manipulative means on this shaft above the upper end of the hollow shaft, and means adjacent thereto for holding said hollow shaft and the shaft extending therethrough together and holding said crank arm stationary in said stirrup, to rotate with the shafts, and indicating means adjacent the manipulative means, to gage the adjustment of the crank arm as it is moved across the axis of the shaft when the shaft extending through the hollow shaft is rotated therein.

21. In a gas meter, in combination with a rotatable valve, operative connecting means comprising a hollow shaft, a stirrup fixed to the lower end thereof, a crank arm adjustable across the axis of the shaft in said stirrup, a shaft extending through said hollow shaft, manipulative means on this shaft above the upper end of the hollow shaft, and means adjacent thereto for holding said hollow shaft and the shaft extending therethrough together and holding said crank arm stationary in said stirrup, to rotate with the shafts, and indicating means adjacent the manipulative means, to gage the adjustment of the crank arm as it is moved across the axis of the shaft when the shaft extending through the hollow shaft is rotated therein, said indicating means being adapted to connect said operative connecting means to said rotatable valve.

22. In a gas meter, in combination with a rotatable valve, operative connecting means comprising a hollow shaft, a stirrup fixed to the lower end thereof, a crank arm adjustable across the axis of the shaft in said stirrup, a shaft extending through said hollow shaft, manipulative means on this shaft above the upper end of the hollow shaft, and means adjacent thereto for holding said hollow shaft and the shaft extending therethrough together and holding said crank arm stationary in said stirrup, to rotate with the shafts, a plate rotatable on the hollow shaft near its upper end, adjacent the manipulative means, and clamping means for said plate to hold it for rotation with the hollow shaft, said plate having means for connecting it to said rotatable valve.

23. In a gas meter, operative connecting means comprising a hollow shaft, a stirrup fixed to the lower end thereof, a crank arm adjustable across the axis of the shaft in said stirrup, a shaft extending through said hollow shaft, manipulative means on this shaft above the upper end of the hollow shaft, and means adjacent thereto for holding said hollow shaft and the shaft extending therethrough together and holding said crank arm stationary in said stirrup, to rotate with the shafts, a valve box, a rotatable valve thereon, a plate adjustable around the hollow shaft, clamping means for the plate to hold it for rotation with the shaft, indicating means for gaging the adjustment of said plate, and means for engagement between said plate and said rotatable valve, said plate and its clamping and indicating means and the engagement means being in said valve box, under said valve.

24. In a gas meter, operative connecting means comprising a hollow shaft, a stirrup fixed to the lower end thereof, a crank arm adjustable across the axis of the shaft in said stirrup, a shaft extending through said hollow shaft, manipulative means on this shaft above the upper end of the hollow shaft, and means adjacent thereto for holding said hollow shaft and the shaft extending therethrough together and holding said crank arm stationary in said stirrup, to rotate with the shafts, a valve box, a rotatable valve thereon, a plate adjustable around the hollow shaft, clamping means to hold the plate to rotate with the shaft, indicating means on said plate adjacent the manipulative means for the inner shaft, for gaging the adjustment of the crank arm and means for engagement between said plate and said rotatable valve, said plate and said clamping and manipulating and indicating means, and the engaging means, being under said valve, inside the valve box.

25. In a gas meter, a valve box comprising a central circular compartment and segmental compartments surrounding the central compartment, each segmental compartment being of greater radial extent near its ends that it is near its middle region, for the purposes set forth.

26. In a gas meter, a valve box comprising a central circular compartment, and segmental compartments surrounding the central compartment, each with its inner wall formed by the surrounding wall of the central compartment, but the outer wall of each being an arc of greater radius than that from any part of this wall to the center of the valve box, whereby each segmental compartment is of greater radial extent near its ends than it is near its middle region, for the purposes set forth.

27. In a gas meter, a valve box comprising a central circular compartment and segmental compartments surrounding the central compartment, each segmental compartment being of greater radial extent near its ends than it is near its middle region, and a valve of circular contour rotating on said valve box concentrically with the valve box and its own contour, having segmental openings passing over said segmental compartments.

28. In a gas meter, a valve box comprising a central circular compartment and segmental compartments surrounding the central compartment, each segmental compartment being of greater radial extent near its ends that it is near its middle region, and a valve of general circular contour rotating on said valve box concentrically with the valve box and with its own contour, having a segmental opening passing over said segmental openings and communicating with said central opening in the valve box, a cover over said opening and its communication with the central opening in the valve box, said valve having another segmental opening, uncovered, but communicating only with said segmental openings in the valve box.

29. In a gas meter, a valve box comprising a central circular compartment and segmental compartments surrounding the central compartment, each segmental compartment being of greater radial extent near its ends than it is near its middle region, and a valve rotating on said valve box, said valve having means for alternately forming closed communication between the respective segmental compartments and said central compartment, or leaving said respective compartments open.

30. In a gas meter, a main cylindrical casing, a dome thereon forming a valve gallery, a valve box within the valve gallery attached to said main casing, said valve box comprising a central compartment and segmental compartments surrounding the central compartment, said casing having an aperture through to its interior from within one of the segmental compartments, ports leading from the other segmental compartments along the top of the main casing within the valve gallery, said casing having apertures through to its interior from the respective ports, an outlet for the meter, a port leading from the central compartment of the valve box through but excluded from some of the segmental compartments and communicating with the outlet, and means forming an inlet into the valve gallery.

31. In a gas meter, a dome inclosing a valve gallery, a dial box rigidly secured to the dome and extending therein, a dial frame fitting into said dial box, being inserted from the front of the dial box, a front for the dial box, inserted in front of the dial frame and having an extension into the region of the dial box within the dome, and a pin inserted through the dial box and through the extension, inside the dome, to hold said front and confine the dial frame to the dial box, and means for closing said dome to prevent access to said pin, for the purposes set forth.

32. In a gas meter, a dial mechanism, a rotatable valve mechanism, a worm turning with the valve mechanism, a worm wheel to turn the dial mechanism, and in mesh with the worm, a hub on the dial mechanism, a frame comprising an arm and a clamp collar and bearings rotatably supporting the worm wheel, said collar fitting on the hub of the dial mechanism and having non-rotary engagement therewith, and a shank for the dial mechanism extending through said hub, said worm wheel having means for engagement with the shank to rotate it but to be drawn away therefrom as the clamp collar of the frame is removed from the hub, and means for engagement between the worm and the rotary valve mechanism, permitting disengagement across the axis of rotation of the valve mechanism.

33. In a gas meter, a dial box having interior projections from its walls forming slides from front to rear thereof, and a dial frame fitting into and guided by said slides, inserted from the front of said dial box.

34. In a gas meter, a permanently closed main casing, a dome on the main casing with means difficult of opening, a dial box and a dial mechanism therein, said dial box permitting the release of the dial mechanism only upon access to the dome interior, diaphragms in the main casing dividing it into compartments, operative connecting means from the diaphragms up to the dial mechanism, connecting therewith inside said dome, a valve inside the dome controlling supply of gas to and exhaust of gas from said compartments in the main casing, and associated with said operative connecting means to be operated thereby, and means inside said dome for adjusting the connection of said operative connecting means to said diaphragms, and means inside the dome for adjusting the connection of said valve with said operative connecting means, the respective adjusting means being accessible only by opening said dome as aforesaid.

35. In a gas meter, a main casing and a dome thereon inclosing the operative parts of the meter, among which operative parts is admitted the gas, which carries moisture therein, a hollow base supporting the casing to protect said operative parts from exterior moisture, and drain spouts through the hollow base into the main casing, for draining said casing of moisture carried in by the gas, for the purposes set forth.

HARRY B. THORNTON.
JOHN W. HAMMOND.

Witnesses:
 JAMES N. RAMSEY,
 CLARENCE PERDEW.